United States Patent [19]

Nomura et al.

[11] Patent Number: 4,731,527
[45] Date of Patent: Mar. 15, 1988

[54] AN ASTIGMATIC FOCUSING SYSTEM WITH OPTICAL ELEMENTS ORIENTED TO PRODUCE ASTIGMATISM IN A PREDETERMINED DIRECTION TO MAXIMIZE DETECTOR SENSITIVITY

[75] Inventors: Susumu Nomura; Takanori Maeda, both of Saitama, Japan

[73] Assignee: Pioneer Electronic Corporation, Tokyo, Japan

[21] Appl. No.: 883,396

[22] Filed: Jul. 8, 1986

[30] Foreign Application Priority Data

Jul. 8, 1985 [JP] Japan .................................. 149833

[51] Int. Cl.⁴ ............................................... G01J 1/20
[52] U.S. Cl. .................................... 250/201; 369/45
[58] Field of Search .......... 250/201 DF, 204, 201 AF; 369/44, 45, 46

[56] References Cited

U.S. PATENT DOCUMENTS

| | | | |
|---|---|---|---|
| 4,079,247 | 3/1978 | Bricot et al. | 250/201 DF |
| 4,163,149 | 7/1979 | Sawano et al. | 250/204 |
| 4,358,200 | 11/1982 | Heemskerk et al. | 369/45 |
| 4,525,625 | 6/1985 | Abe | 369/45 |
| 4,561,080 | 12/1985 | Yamazaki | 250/201 DF |
| 4,614,863 | 9/1986 | Sato | 250/201 DF |
| 4,625,303 | 11/1986 | Shikama et al. | 369/45 |

Primary Examiner—David C. Nelms
Assistant Examiner—William L. Oen
Attorney, Agent, or Firm—Sughrue, Mion, Zinn, Macpeak, and Seas

[57] ABSTRACT

An optical pickup for astigmatic focusing on an optical disk. A planar beam splitter reflects light from a source through an objective lens to the recording track of the disk. The light reflected from the disk is transmitted through the beam splitter. The beam splitter is inclined to the optical axis so that astigmatism is produced on transmission. A cylindrical lens is placed along the path of the transmitted light and is oriented so that the combined astigmatism is aligned with a quadruple element detector.

7 Claims, 11 Drawing Figures (a)   (b)   (c)

(a)   (b)   (c)

(a)   (b)   (c)

AN ASTIGMATIC FOCUSING SYSTEM WITH OPTICAL ELEMENTS ORIENTED TO PRODUCE ASTIGMATISM IN A PREDETERMINED DIRECTION TO MAXIMIZE DETECTOR SENSITIVITY

BACKGROUND OF THE INVENTION

1. Field of the Invention

The present invention generally relates to an optical pickup, and particularly relates to an optical pickup used for detecting a focusing error by an astigmatism method.

2. Background Art

There exists an apparatus for recording information onto an optical information recording disk (hereinafter, merely referred to as an optical disk) or reading recorded information from the optical disk. In such an apparatus, an astigmatism method is known as one of the methods of detecting a focusing error of a light beam irradiated from a pickup for recording/reading information.

As the optical pickup used for detecting the focusing error by this astigmatism method, there has been conventionally proposed such an apparatus as shown in FIG. 1. In the drawing, light emitted from a light source 1 such as a laser diode, or the like, enters a half beam splitter 2 and is partially deflected by its reflection surface. Then, the thus deflected light radiates through an objective lens 3 onto a recording surface of an optical disk 4 as a focused beam. The light reflected from the optical disk 4 in response to the light irradiated onto the optical disk 4 is converged by the objective lens 3 and transmitted through the half beam splitter 2. At this time, astigmatism is hardly generated in the light transmitted through the half beam splitter 2 because the light-incident and emitting surfaces of the half beam splitter 2 are set perpendicularly to an optical axis of the reflection light.

The light transmitted through the half beam splitter 2 is made astigmatic by its passage through a cylindrical lens 5 and thereafter impinges onto an optical detector 6. Being astigmatic, the shape of the luminous flux imaged on a light-reception surface of the optical detector 6 is changed depending on the positional relationship between the recording surface of the optical disk 4 and a convergence point of the light irradiated onto the disk. In order to detect this change in shape of the luminous flux, the optical detector 6 is composed of four individual elements disposed as if the light-reception surface is divided into four parts divided by two straight lines perpendicular to each other. The optical detector 6 is arranged such that its light-reception surface is disposed at the position where the shape of the luminous flux becomes circular when it is focused (a focusing error is zero). A sum of respective output is obtained for each pair of elements disposed opposite to each other with respect to a center of the light-reception surface. A differential output between the thus obtained respective sums of the two pairs of elements is derived as a focusing error signal. If the optical pickup and the optical disk 4 are in a predetermined relationship, the luminous flux at the optical detector 6 is circular and the difference of the sums is zero. However if the optical disk 4 is displaced in either direction, the difference of the sums is non-zero with the sign of the difference indicating the direction of displacement.

In the thus arranged conventional pickup, however, there has been such a disadvantage that much time is consumed for producing the half beam splitter 2 because it is necessary to fabricate the half beam splitter 2 by sticking glass optical elements or the like to each other, resulting in an increase in cost as well as increase in weight of the apparatus.

Further known is another conventional apparatus, shown in FIG. 2, proposed to eliminate the foregoing disadvantage. The apparatus of FIG. 2 employs a parallel-plane beam splitter 7 which is provided with light-incident and emitting surfaces arranged to be inclined relative to an optical axis of reflection light.

In the thus arranged conventional apparatus, astigmatism and the like are given to light by the beam splitter 7 when the light is passed through the latter because the light-incident and emitting surfaces of the beam splitter 7 are arranged to be inclined relative to an optical axis of converged light. Therefore, it is unnecessary to use such a beam splitter that is constituted by glass members or the like stuck to each other. As a result, the apparatus of FIG. 2 can be reduced in cost and weight in comparison with that of FIG. 1.

The apparatus of FIG. 2 is, however, disadvantageous in that the shape of luminous flux imaged on the light-reception surface of an optical detector 6 is disturbed because not only astigmatism but also other aberrations are generated by the beam splitter 7 when the light is transmitted therethrough. Therefore these disturbances have a bad influence on the focusing error signal or the like. If the thickness of the beam splitter 7 is decreased in order to prevent this aberration from being generated, it is difficult to maintain good surface accuracy of the beam splitter 7 so that the shape of the focused beam on the optical disk 4 is disturbed and the disturbance has a bad influence on recorded information or information to be read. Further, the direction of the astigmatism generated by the beam splitter 7 is determined only by the inclination of the beam splitter 7, so that there are restrictions on the arrangement of the pickup and in the shape of the optical detector in providing separation of the direction of the astigmatism from the direction of detection of a tracking signal. These restrictions result in a reduction in the number of degrees of freedom in designing the apparatus.

Known is a further conventional pickup having such the structure shown in FIG. 3. In the drawing, light irradiated from a light source 1 is made to be substantially parallel light rays by a condenser lens 8. The light reflected by an optical disk 4 is transmitted through a parallel-plane beam splitter 7. Astigmatism and the like are hardly generated by the beam splitter 7 because the reflection light caused to be incident into the beam splitter 7 has been made to be parallel light rays. The light transmitted through the beam splitter 7 is converged by a condenser lens 9 and thereafter astigmatism is given to the converged light by a cylindrical lens 5.

In the thus arranged conventional apparatus, it is possible to eliminate the foregoing disadvantages in the conventional one of FIG. 2 because no aberration other than astigmatism is generated. However, the apparatus is disadvantageous in that the number of parts and portions to be adjusted are increased, resulting in increase in size, in cost, as well as in weight of the pickup.

SUMMARY OF THE INVENTION

The present invention is intended to eliminate the foregoing disadvantages in the prior art. Thus, an object of the present invention is to provide an optical pickup which can be reduced in size, in weight, as well as in cost, and in which it is possible to obtain good-quality recorded or read-out information.

The optical pickup of the invention has a beam splitter provided with light-incident and emitting surfaces inclined to an optical axis of converged light reflected from a recording surface of a disk. An optical detector receives light transmitted through the beam splitter, whereby a detection output of the optical detector is used as an information signal for determining a focusing error. According to the present invention, optical elements between the beam splitter and the optical detector provide astigmatism to the light passed through the beam splitter. The optical elements are oriented so that the astigmatism due to the optical elements is generated in a predetermined direction relative to the direction of generation of astigmatism due to the beam splitter.

DETAILED DESCRIPTION OF THE PREFERRED EMBODIMENTS

Figure 1:
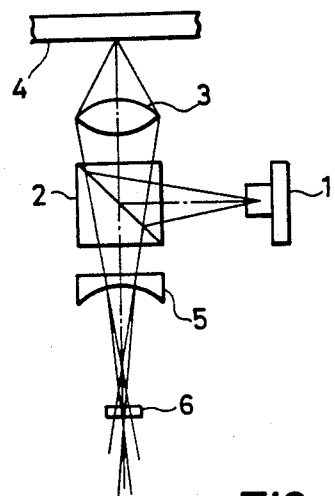
FIGS. 1 through 3 are diagrams showing the respective arrangements of three conventional focusing error devices.

Referring to the drawings, embodiments according to the present invention will be described in detail hereunder.

Figure 2:
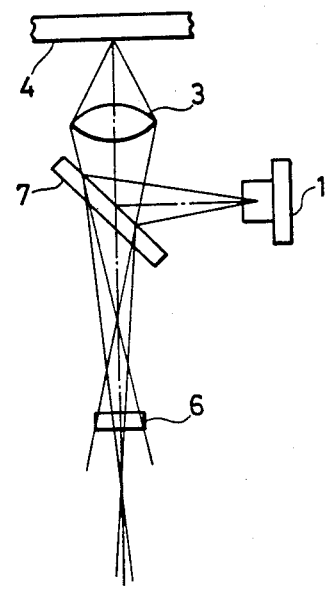
Figure 3:
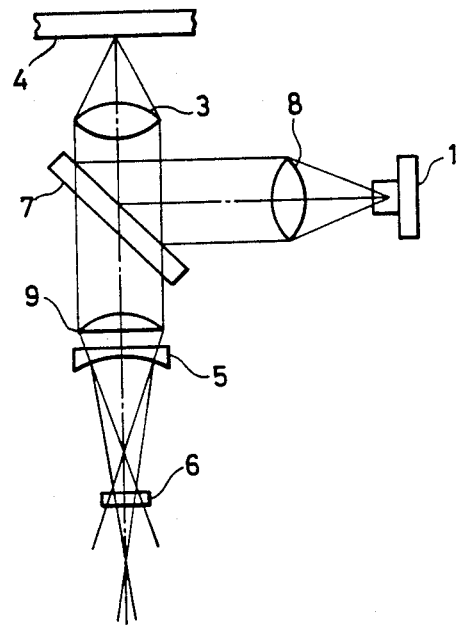
Figure 4:
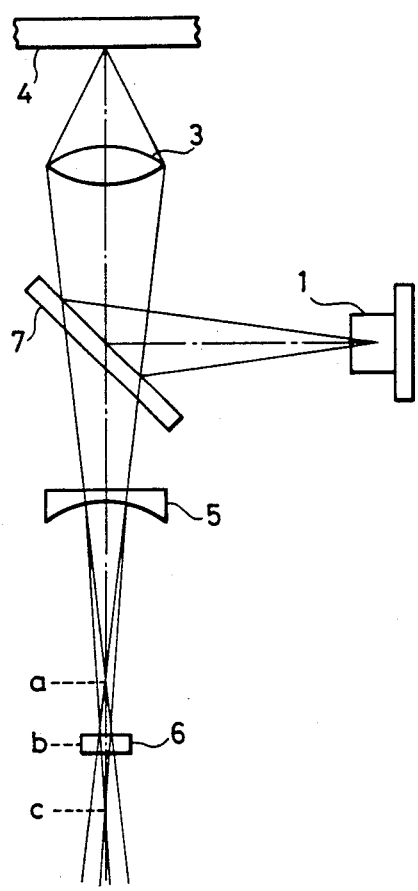
FIG. 4 is a diagram showing the arrangement of an embodiment according to the present invention.

FIG. 4 is a diagram showing the arrangement of an embodiment of the optical pickup according to the present invention. In FIG. 4, items corresponding to those of FIGS. 1 through 3 are correspondingly referenced. In the drawing, light emitted from a light source 1 is deflected by a parallel-plane half beam splitter 7 and the thus deflected light irradiates through an objective lens 3 onto a recording surface of an optical disk 4 as a focused beam. The light reflected in response to the light irradiated onto the optical disk 4 is again converged by the objective lens 3 and transmitted through the half beam splitter 7. At this time, astigmatism and other aberrations are generated in the light transmitted through the beam splitter 7 because the beam splitter 7 is oriented such that its light-incident and emitting surfaces are inclined to an optical axis of the reflected light. The reflected light continues to converge after passing the half beam splitter.

Figure 5:
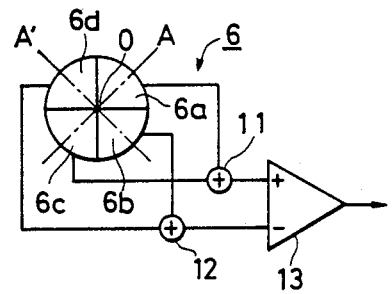
FIG. 5 is a diagram showing a circuit for operation a focusing error signal on the basis of a detection output of the optical detector.
Figure 6:
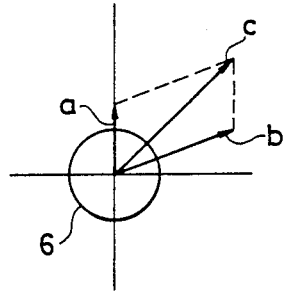
FIG. 6 is a graph showing the relationship between the astigmatism generated by the beam splitter, the astigmatism generated by the cylindrical lens, and the combination of the two astigmatisms.

A cylindrical lens 5, provided between the beam splitter 7 and an optical detector 6, gives astigmatism only to the light transmitted through the beam splitter 7. This cylindrical lens 5 is arranged such that astigmatism is generated by the cylindrical lens 5 at a predetermined angle relative to the direction of generation of astigmatism due to the beam splitter 7. Furthermore, the direction of the combination of the astigmatism generated by the beam splitter 7 and the astigmatism generated by the cylindrical lens 5 is made to provide the maximum sensitivity of the optical detector 6. That is, the combination of the two astigmatic effect is made to extend along a line A or A' on the light-reception surface of the optical detector 6 shown in FIG. 5. Therefore, in the optical detector 6, the maximum sensitivity can be obtained as shown in FIG. 6. In FIG. 6, the reference symbol a designates astigmatism generated by the beam splitter; b, astigmatism generated to cylindrical lens; and c, the combined astigmatism of both of them. In the optical detector 6 of FIG. 5, the output of an element 6a is added to that of an element 6c by an adder 11 while the output of an element 6b is added to that of an element 6d by an adder 12. Each of the pairs of elements 6a and 6c and of the elements 6b and 6c are opposed to each other with respect to a center 0 of the light-reception surface of the optical detector 6. The respective sums of the outputs of the pairs are received by a differential amplifier 13 so as to obtain a focusing error signal.

Figure 7:
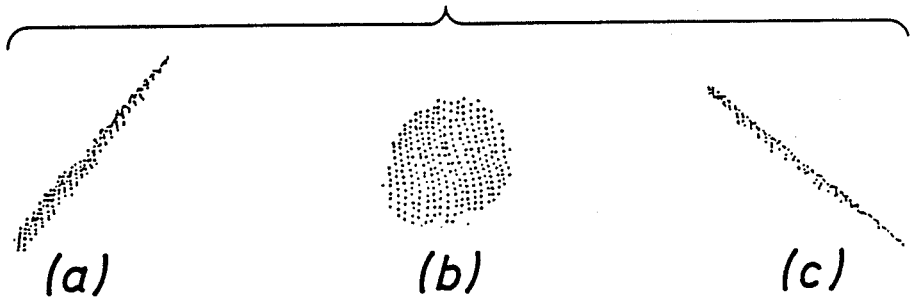
FIG. 7 is a diagram showing results of simulation of shapes of luminous flux obtained in the apparatus according to the present invention.
Figure 8:
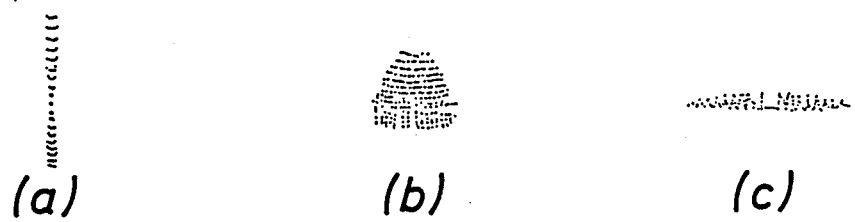
FIGS. 8 and 9 are diagrams showing results of simulation of shapes of luminous flux obtained in the conventional apparatuses.
Figure 9:
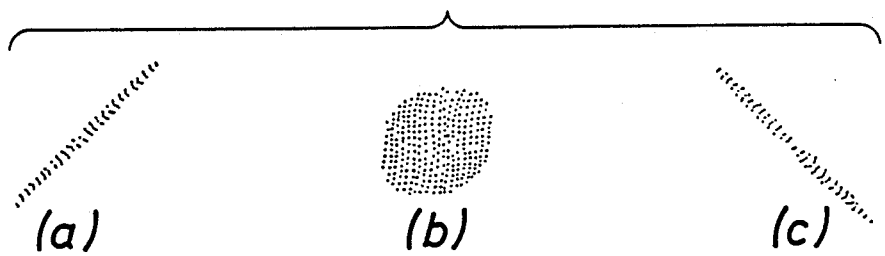

Next, in the optical pickup according to the present invention, the luminous flux has, for example, line-like cross-sectional shapes (a) and (c) as shown in FIG. 7 at two axial points corresponding to two focused lines resultant from the astigmatism. The luminous flux has a shape (b) at an intermediate position between the points of the focused lines. That is, shapes (a), (b) and (c) are the shapes at the respective positions a, c, and b of FIG. 4. These shapes were obtained by simulation using a computer. For the sake of comparison, shapes of luminous flux shapes have been obtained for both the foregoing conventional apparatuses in the same manner as described above. The shapes (a), (b) and (c) of FIG. 8 show the luminous flux shapes in the prior art device of FIG. 2 and the shapes (a), (b) and (c) of FIG. 9 show the luminous flux shapes in the prior art devices of both FIGS. 1 and 3. It is noted that when the position of the optical disc 4 is changed, point a or c is brought toward the optical detector 6. The optical detector 6 can discriminate not only the magnitude of the positional change but also its direction.

Thus, in the conventional apparatus of FIG. 2, the symmetry of the luminous flux shape, as shown in FIG. 8, is disturbed by the generation of harmful abberation other than astigmatism. This disturbance has a bad influence on a focusing error signal. According to the present invention, however, the astigmatism is added by the cylindrical lens 5 to the astigmatism generated by the beam splitter 7 so that the combined astigmatism is arranged at such an angle as to provide the maximum sensitivity of the optical detector 6. Therefore, as seen in FIG. 7, the shape of luminous flux are substantially the same as those shown in FIG. 9 obtained in each of the conventional apparatuses of FIGS. 1 and 3, and a good-quality signal can be obtained.

Figure 10:
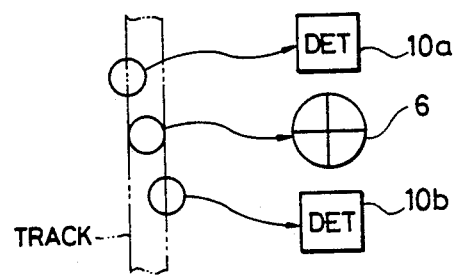
FIG. 10 is a diagram showing the arrangement of the optical detectors in the case where a tracking error is detected by the three-beam method.

In one type of tracking servo, the recording track of an optical disk 4 is followed by an information recording/reading beam. A pair of optical detectors 10a and 10b are linearly arranged at the opposite sides of the focusing optical detector 6 as shown in FIG. 10. The illustrated device provides a so-called three-beam method. In the conventional pickup of FIG. 2, the orientation direction of the quadruple optical detector 6 is determined depending on the tracking servo so that the direction of one of the two dividing lines between the elements 6a–6d on the light-reception surface of the quadruple optical detector 6 coincides with the direction of the track as shown in the drawing. This orientation prevents a deleterious influence on the focusing error signal arising from a shadow of the recording track which would be otherwise generated when the recording track crosses the quadruple optical detector 6. Further, the direction of the optical detector 6 for obtaining the above-mentioned focusing error signal varies depending on the arrangement of an optical system. Therefore it has been necessary to replace the optical detector by another one depending on the arrangement of an optical system.

In the optical pickup according to the present invention, however, it is possible to desirably set the direction of generation of astigmatism by the cylindrical lens 5, and therefore it is unnecessary to change the optical detector even when the arrangement of the optical system is changed.

Figure 11:
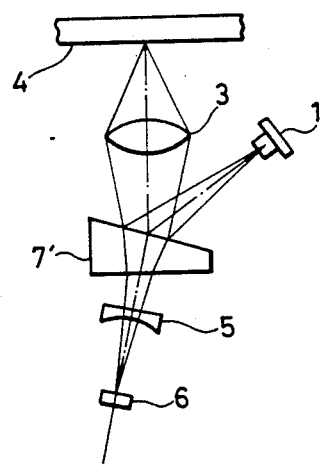
FIG. 11 is a diagram showing another embodiment according to the present invention.

Although, a concave cylindrical lens is used as an optical element for providing astigmatism to the light through the beam splitter 7 in the foregoing embodiment, the present invention is not limited to this. The same effect can be obtained by any other optical element for generating astigmatism, for example, a toric lens or the like. Further, although description has been made as to the case where the parallel-plane beam splitter 7 is used in the foregoing embodiment, any device can be used so long as it can generate astigmatism. For example, such a non-planar beam splitter 7, as shown in FIG. 11, having opposite surfaces which are not parallel to each other may be used. In short, any beam splitter can be used so long as it has light-incident and emitting surfaces inclined relative to an optical axis of converged light irradiated onto a recording surface of a optical disk.

As described above, in the optical pickup according to the present invention, an optical element is provided between an optical detector and a beam splitter for providing astigmatism to light passed through the beam splitter so as to make it possible to adjust the direction of generation of combined astigmatism to agree with the direction of the optical detection to maximize the sensitive of the detector. Accordingly, it is possible to obtain an optical pickup in which high-quality recorded or read information can be easily obtained by using only a few component and which is reduced in size, in weight, as well as in cost.

We claim:
1. An optical pickup for determining a position of an object comprising:
   a light source;
   an optical detector for providing a focusing error signal;
   a beam splitter receiving light from said source for reflecting at least part of said light to a first surface of an object whose position is being determined and for transmitting through first and second free surfaces of said beam splitter at least part of the light reflected from said first surface of said object to said optical detector, at least said first free surface being inclined to an optical axis of said reflected light;
   converging means for causing said light reflected from said first surface of said object to converge toward said first free surface of said beam splitter; and
   astigmatism means disposed between said beam splitter and said detector in a path of the transmitted converging light for producing astigmatism in said transmitted light in a predetermined direction relative to the astigmatism produced in said transmitted light by said beam splitter such that the combined astigmatism is arranged at such an angle as to provide the maximum sensitivity of said optical detector.

2. An optical pickup as recited in claim 1, wherein a combination of said astigmatisms produced by said astigmatism means and said beam splitter is oriented at a predetermined angular orientation relative to an optical axis of said detector.

3. An optical pickup as recited in claim 2, wherein said detector comprises four segmented detector elements divided by two perpendicular dividing lines and said combination of astigmatisms is oriented along a bisector of said two dividing lines.

4. A magnetic pickup as recited in claim 1, wherein said beam splitter is a planar beam splitter.

5. An optical detector as recited in claim 1, wherein said astigmatism means is a cylindrical lens.

6. An optical detector as recited in claim 1, wherein said converging means is a lens disposed between said first surface of said and said beam splitter.

7. An optical detector for determining the distance between a detector and a surface of a recording disk, comprising:
   a light source;
   a parallel surface beam splitter for reflecting light from said light source to said recording surface, for receiving light reflected from said recording surface, said parallel surface beam splitter being inclined to an axis of said reflected light, and for transmitting light reflected by said recording surface;
   an objective lens disposed between said beam splitter and said recording surface for focusing said light reflected by said beam splitter on said recording surface and for converging said light reflected from said recording surface toward a surface of said beam splitter:
   a detector receiving said transmitted light from said beam splitter and having four detector elements separated by two perpendicular dividing lines;
   two summing circuits summing signals from respective pairs of said detector elements disposed across an intersection of said dividing lines;
   a difference circuit receiving outputs of said summing circuits and providing a focusing error signal; and
   a cylindrical lens disposed between said beam splitter and said detector, said cylindrical lens being oriented to cause a combination of astigmatism in said transmitted light produced by said beam splitter and by said cylindrical lens to be oriented along a bisector of said dividing lines to provide the maximum sensitivity of said detector.

* * * * *